Patented Oct. 19, 1954

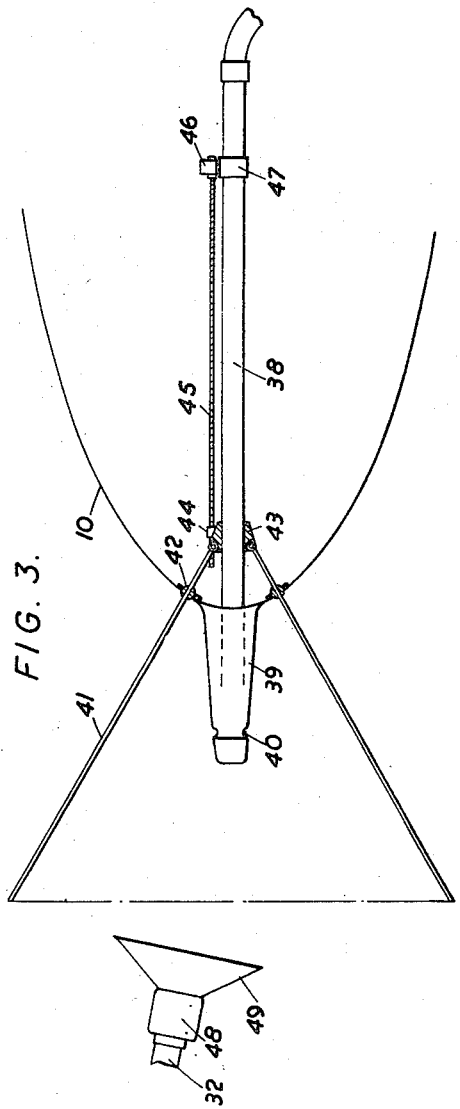
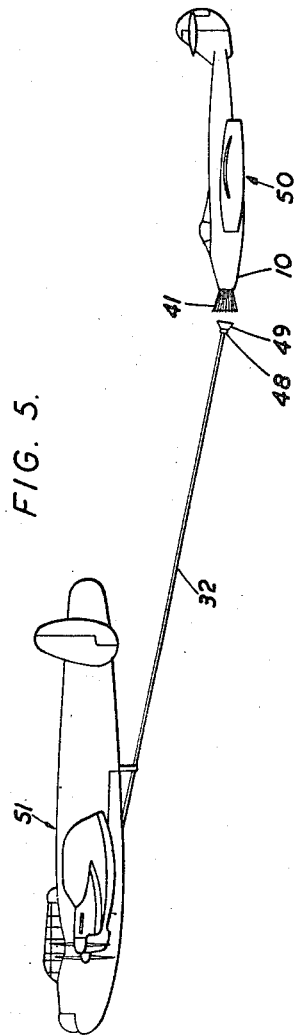

2,692,103

UNITED STATES PATENT OFFICE 2,692,103

APPARATUS FOR TOWING AND REFUELING AIRCRAFT IN FLIGHT

Alan John Cobham, Bournemouth, Cecil Hugh Latimer-Needham, Broadstone, and Peter Stevens Macgregor, Upton, Poole, England, assignors to Flight Refuelling Limited, London, England, a British company Application January 2, 1951, Serial No. 204,022

Claims priority, application Great Britain January 3, 1950

6 Claims. (Cl. 244—135)

This invention, which relates to refuelling of aircraft in flight and to the towing of one aircraft by another with or without refuelling, is an improvement or modification of the invention described in the specification of United States application Serial No. 153,198, filed March 31, 1950.

This specification describes apparatus enabling a physical connection to be established between a "leading" and a "following" aircraft, for the purpose of passing fuel from one to the other or of enabling the following aircraft to be towed by the leader, the apparatus comprising elements mounted on the leading and following aircraft respectively. To summarise the disclosure of this specification, the apparatus described comprises essentially an element in the form of a flexible hose or towing line or a jointed pipe or rod mounted on the leading aircraft and trailed therefrom when contact is to be established, and a rigid element, hollow or otherwise, referred to as a "probe," extending forwardly from the following aircraft, the extremities of the trailing element and of the probe being provided with mutually engageable coupling members.

The present invention, like a preferred form of the invention described in the specification of United States application Serial No. 153,198, provides for making and breaking the refuelling or/ and towing connection, a coupling device of the plug-and-socket type, which is self-engaging on thrusting the plug-member into the socket-member and is disengageable by imposing on the coupling device a tension exceeding a critical value; and the coupling device may be provided with remotely controllable means for locking it in engagement, as described in the specification of United States application Serial No. 153,198. One member of the coupling is mounted on the extremity of an effectively flexible element trailable by the leading aircraft, e. g. a flexible hose or cable, or a jointed or/and telescopic pipe or rod, and the other is mounted on the following aircraft with its axis substantially in the line of flight.

The improvement or/and modification according to the present invention comprises, in respect of the apparatus installed in the following aircraft, the provision of a forwardly extending funnel-shaped guide, which may be of skeleton construction, surrounding the coupling member, the latter being mounted on any convenient part of the aircraft which is unobstructed from in front, and not necessarily on a specially provided forwardly extending structure or "probe"; and in respect of the leading aircraft, the provision on the terminal portion of the trailable element, in addition to or unitary with a drogue or other drag-creating device capable of holding the trailable element, or its terminal portion at least, substantially horizontal in flight, of a guiding element in the form of a rigid flange or ring of smaller diameter than the maximum diameter of the funnel-shaped guide above mentioned.

When the following aircraft approaches the leading aircraft from behind, the guiding element can enter the funnel-shaped guide and engage it slidingly to guide the complementary coupling members into alignment.

The funnel-shaped guide may be collapsible or/and retractable; and the drag-creating device may be a parachute or simple "parasheet."

Two specific embodiments of the invention are illustrated in the accompanying drawings by way of example only and without limitation of the scope of the invention as defined in the appended claims. In the drawings:

Figures 3 and 4 are views similar to Figures 1 and 2 respectively of a second embodiment.

Figure 5 is an outline view in side elevation of two aircraft equipped with apparatus as illustrated in Figures 3 and 4 about to make connection.

Figure 1:
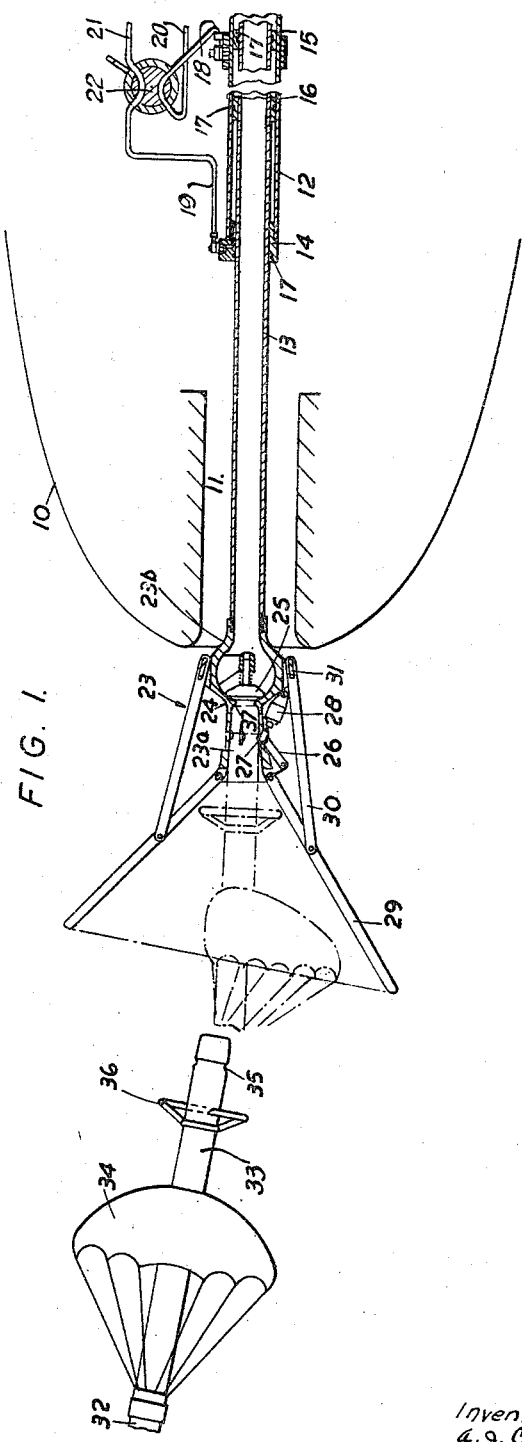
Figure 1 is a side elevation partly in section of one embodiment.

In Figures 1 and 3, 10 is the nose of the "following" aircraft shown in outline. In it is formed a tunnel 11 whose axis is in the line of flight and which is open at the front end. Within this tunnel is mounted a tube 12 in which slides an inner tube 13 whose inboard end is connected by means of a sliding gland or flexible connection (not illustrated) with the fuel system of the aircraft. Between the tubes 12, 13 is an annular space closed at its ends by collars 14, 15 attached to tube 12 and divided in the middle by a collar 16 attached to tube 13. The collars 14, 15, 16 are provided with sealing means 17, and the assembly of tubes 12, 13 and collars 14, 15, 16 constitute a double-acting hydraulic or pneumatic jack whose working chambers are formed by the two parts of the annular space between the tubes, the collar 16 constituting the piston. Pipes 18, 19 communicating respectively with one and the other of the chambers of the jack are selectively connectible to a fluid pressure line 20 and a return or atmospheric line 21 by means of a two-piston selector valve 22. This mechanism enables the apparatus mounted on the extremity of tube 13 to be retracted into the channel 11 or extended therefrom.

The apparatus mounted on the end of tube 13 comprises a coupling member in the form of a socket 23, having a tapered throat 23a separated from an enlarged part 23b by a constriction 24 providing a seating for a spring-loaded valve poppet 25. Latch-levers 26 are pivoted on the mouth of the socket 23 and carry latch-rollers 27 which are caused to project into the throat of the socket through slots by means of spring-plunger devices 28.

On the mouth of the socket 23 are pivoted numerous rods 29 arranged to form a skeleton funnel when extended. To each rod 29 is pivoted one end of a strut 30, whose other end is connected by a pin and slot joint 31 to the enlarged part 23b of socket 23.

The "leading" aircraft trails a flexible hose 32 terminating in a rigid nozzle 33 to the base of which is attached a parasheet 34. The nozzle terminates in a tapered portion which fits in the throat 23a of socket 23 and has a circumferential groove 35 engageable by the latch-rollers 27.

On the nozzle 33 is mounted a rigid ring or flange 36 of considerably smaller diameter than the mouth of the guide funnel formed by rods 29. Ring 36 is set back from groove 35 so as just not to jam on rods 29 when the nozzle is fully home in the socket, as shown in chain-dotted lines, with its tip seated on the constriction 24, which is provided with a sealing ring 37. In this position an element (not shown) located centrally in the nozzle can be operated by remote control to move the poppet 25 off its seating.

When tube 13 is retracted to withdraw socket 23 inside tunnel 11 the walls of the latter engage the struts 30 and cause rods 29 to collapse inwards and the collapsible funnel-shaped guide is thus stowed inside tunnel 11.

Figure 4:
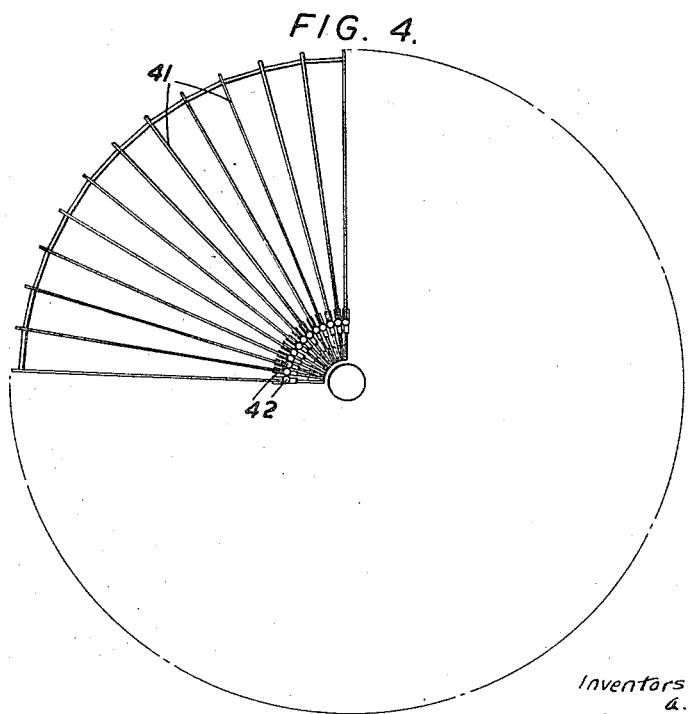

In Figures 3 and 4, a tube 38, mounted in the nose 10 of the "following" aircraft and connected with its fuel system, terminates in a short probe or nozzle 39 extending forwardly in the line of flight and having a tapered extremity and a circumferential groove 40.

Rods 41 slide in members 42 rotatably mounted in the nose of the aircraft surrounding the nozzle 39, and are pivoted within the nose to a collar 43 which slides on tube 38. Collar 43 carries a nut 44 in threaded engagement with a lead-screw 45 forming an extension of the shaft of an electric motor 46 mounted on a collar 47 secured to tube 38.

When the motor is operated to extend the rods 41 the latter open out to form a skeleton funnel-shaped guide; and when the collar 43 is withdrawn rods 41 are retracted and the guide is collapsed and stowed.

The trailing hose 32 in Figure 3 terminates in a socket 48 similar in construction to socket 23 of Figure 1, its details not being illustrated. The mouth of socket 48 is extended to form a rigid conical member 49 which serves both as a drogue and as a guiding element functioning similarly to the ring 36 of Figure 1, and also serving to guide the extremity of the probe or nozzle 39 into socket 48. There is in this case a double guiding action, firstly of the rods 41 on the drogue member 49, and secondly of the drogue member on the probe.

The operation is illustrated by Figure 5, which shows a "following" aircraft 50, furnished with a guiding rod system 41 (as in Figures 3 and 4) surrounding a probe or nozzle (not shown, owing to the small scale of the drawing), approaching from behind a "leading" aircraft 51, which trails a hose 32 terminating in a socket 48 and drogue 49 as shown in Figures 3 and 4. The pilot of the following aircraft has extended the guide system 41 and positioned his craft so that the guide rod system is roughly aligned with the drogue 49. By putting on speed the guide rod system will envelope the drogue and guide it into alignment until the probe enters the drogue and is thereby guided into the socket 48. Continued relative forward movement will cause the latches of the socket to engage the groove of the probe.

Figure 2:
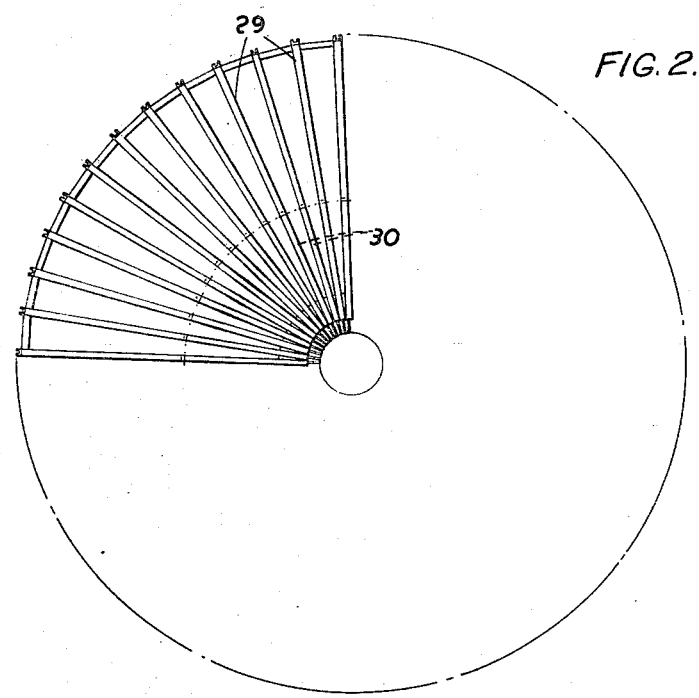
Figure 2 is a front elevation of the right hand portion of Figure 1.

The procedure when using the apparatus of Figures 1 and 2 is essentially the same.

We claim:

1. In an installation for operatively joining two aircraft in flight, as for the purpose of towing or refueling, the combination of cooperating connecting means carried by the following and leading aircraft, said means comprising a coupling member carried by a portion of said first named aircraft and facing forwardly in the direction of flight, means mounting said coupling member upon said first named aircraft rigidly against movement in any direction transverse to the line of flight and in a position where it is unobstructed from in front; an element trailable rearwardly from said second named aircraft; a rigid circular guiding element mounted concentrically on the trailing element near the extremity thereof; a coupling member mounted on the extremity of said trailable element and facing aft in a position to be operatively engaged by said first named coupling member mounted on said first named aircraft when said second named coupling member is forcibly thrust against said first named coupling member in the direction of flight; guiding means for centering said second named coupling member with respect to said first named coupling member as the craft approach each other, said guiding means comprising a funnel-shaped device carried by the first named aircraft and surrounding said first named coupling member and having its flared end extending forwardly of said coupling member, and in the direction of flight, when in operative position; said rigid circular guiding element adapted to contact the inner walls of said funnel-shaped guiding device which surrounds the first named coupling member, and for this purpose being of a diameter less than the maximum outward diameter of said funnel-shaped device.

2. In an installation for operatively joining two aircraft in flight, as for the purpose of towing or refueling, the sub-combination comprising means carried by the following aircraft for attaining the connection with the leading aircraft for the purpose desired, said means comprising a coupling member carried by a portion of said first named aircraft and facing forwardly in the direction of flight; means mounting said coupling member upon said aircraft rigidly against movement in any direction transverse to the line of flight and in a position where it is unobstructed from in front, all whereby said forwardly facing coupling member may be engaged with a complementary coupling member trailed rearwardly from said other aircraft by thrusting said first named coupling forcibly in the direction of flight against such complementary member; guiding means for centering said second-named coupling member with respect to said first-named coupling member as the craft approach each other, said guiding means comprising a radially inwardly collapsible funnel-shaped device carried by the first named aircraft and surrounding said first named coupling member and having its flared end extending forwardly of said coupling when in operative position; and means carried by said following aircraft and operatively connected with said collapsible funnel-shaped device for collapsing said device in a radially inward direction toward the axis thereof and retracting said device rearwardly from operative to idle position.

3. Apparatus as claimed in claim 2, in which the first-named coupling member is the plug-member of a plug-and-socket coupling.

4. Apparatus as claimed in claim 2, in which the first-named coupling member is the socket member of a plug-and-socket coupling.

5. In an installation for operatively joining two aircraft in flight, as for the purpose of towing or refueling, the sub-combination comprising means carried by the leading aircraft for attaining the connection with the following aircraft for the purpose desired, said means comprising an element trailable rearwardly from said first named aircraft; a coupling member mounted on the extremity of said trailable element and facing aft in a position to be operatively engaged by a complementary coupling member mounted on the second named aircraft when the second named coupling member is forcibly thrust against it in the direction of flight; a rigid circular guiding element mounted concentrically on the trailable element near the extremity thereof and spaced inboard from the coupling element; said rigid circular guiding element adapted to contact the inner walls of a funnel-shaped guiding device carried by said second named aircraft around its coupling member, and for this purpose being of a diameter less than the maximum outward diameter of said funnel-shaped device.

6. The sub-combination set forth in claim 5 in which said rigid circular guiding element comprises a substantially conical drag-creating flange, thus serving the additional purpose of aiding in maintaining the substantially horizontal position of the trailable element and the aft-facing aspect of the first named coupling member.

References Cited in the file of this patent

UNITED STATES PATENTS

| Number | Name | Date |
|---|---|---|
| 1,728,449 | Procofieff-Seversky | Sept. 17, 1929 |
| 1,848,372 | Moran | Mar. 8, 1932 |
| 2,199,588 | Cobham et al. | May 7, 1940 |
| 2,582,609 | Steele | Jan. 15, 1952 |
| 2,596,455 | Williams et al. | May 13, 1952 |

OTHER REFERENCES

"Time" Magazine, page 54, Aug. 22, 1949.

"Flight" Magazine, pages 200–204, Aug. 23, 1945.